US011921999B2

(12) United States Patent
Chandrashekar et al.

(10) Patent No.: US 11,921,999 B2
(45) Date of Patent: Mar. 5, 2024

(54) METHODS AND SYSTEMS FOR POPULATING DATA FOR CONTENT ITEM (71) Applicant: Rovi Guides, Inc., San Jose, CA (US)

(72) Inventors: Padmassri Chandrashekar, Karnataka (IN); Daina Emmanuel, Bangalore (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/386,035

(22) Filed: Jul. 27, 2021

(65) Prior Publication Data
US 2023/0035158 A1 Feb. 2, 2023

(51) Int. Cl.
G06F 3/04845 (2022.01)

(52) U.S. Cl.
CPC .................. G06F 3/04845 (2013.01)

(58) Field of Classification Search
CPC ... G06F 3/04845; G06F 3/0484; G06F 3/0482
USPC ......................................................... 715/751
See application file for complete search history.

(56) References Cited

U.S. PATENT DOCUMENTS

| | | | | |
|---|---|---|---|---|
| 7,870,089 | B1* | 1/2011 | Hall, III | H04L 51/08 |
| | | | | 705/50 |
| 9,569,549 | B1* | 2/2017 | Jenkins | G06F 16/29 |
| 2004/0003056 | A1* | 1/2004 | Yamaguchi | G06F 16/40 |
| | | | | 709/219 |
| 2008/0115055 | A1* | 5/2008 | Sadovsky | G06F 40/151 |
| | | | | 715/255 |
| 2010/0185922 | A1* | 7/2010 | Haas | G06F 16/20 |
| | | | | 714/E11.021 |
| 2011/0093492 | A1* | 4/2011 | Sull | G06F 16/7844 |
| | | | | 707/769 |
| 2011/0145275 | A1* | 6/2011 | Stewart | G06F 16/435 |
| | | | | 707/769 |
| 2012/0246685 | A1* | 9/2012 | Fink | G06F 16/784 |
| | | | | 725/60 |
| 2013/0055104 | A1* | 2/2013 | Everingham | H04N 1/00159 |
| | | | | 715/751 |
| 2014/0074855 | A1* | 3/2014 | Zhao | H04N 21/8456 |
| | | | | 707/746 |
| 2014/0376823 | A1* | 12/2014 | Cui | G06F 16/5838 |
| | | | | 382/219 |
| 2015/0067505 | A1* | 3/2015 | Metcalf | G06F 16/958 |
| | | | | 707/751 |
| 2017/0366491 | A1* | 12/2017 | DeLuca | H04L 51/212 |

(Continued)

FOREIGN PATENT DOCUMENTS

CN 107306274 A * 10/2017
EP 1990743 A1 * 11/2008 ............. G06F 16/58

*Primary Examiner* — Hwei-Min Lu
(74) *Attorney, Agent, or Firm* — Haley Guiliano LLP (57) ABSTRACT Systems and methods are presented for populating content item metadata are described herein. The system receives a content item. The system then receives at the user device selections of identifier tags that are indicative of the source or context of the content item. The system updates at the server the content item along with the metadata and stores it for retrieval. In response to the user device receiving a second content item determined to be the same as the first content item, the system replaces the second content item with a link to the first content item. Once a user interaction with the link is detected, the system may follow the link to generate for display the content item.

18 Claims, 7 Drawing Sheets

(56) References Cited

U.S. PATENT DOCUMENTS

| | | | |
|---|---|---|---|
| 2018/0373415 A1* | 12/2018 | Dellinger | G06F 3/0486 |
| 2019/0272770 A1* | 9/2019 | Kortan | G09B 5/065 |
| 2020/0218762 A1* | 7/2020 | Jain | G06Q 50/01 |
| 2021/0034657 A1* | 2/2021 | Kale | G06F 16/48 |
| 2021/0089575 A1* | 3/2021 | Pulicharla | G06F 16/783 |
| 2021/0271725 A1* | 9/2021 | Srinivasan | G06F 16/9577 |

* cited by examiner

METHODS AND SYSTEMS FOR POPULATING DATA FOR CONTENT ITEM

BACKGROUND

The present disclosure is directed to populating metadata in images and, more particularly, to populating meme content items with source metadata based on user input.

SUMMARY

Current communications platforms enable users to easily exchange images, such as screenshots, memes, GIFs, and other types of images without any context. Often, these images refer to content, such as a televised event, a show or movie, an interview, a song, or another type of content item, and are forwarded or shared without providing the source or any other information to the recipient. For example, the image may be a screenshot from a television show with a humorous caption overlaid onto the image (e.g., a meme). In another example, the image may show a person performing an action that mirrors an action performed by a celebrity (e.g., a GIF). The recipient of such an image must know the source content upon which the image is based to understand the image. If the sender and the recipient are unfamiliar with the source content, the image is ineffective as a method of communication. Current systems lack the ability to provide the recipient of the image with source information that gives context to the image. The source image should not merely be the location from which the image was obtained but should instead provide context to the image such that the user may understand the communication. The applications within which the image is exchanged and the server do not have access to information about the media from which the image was derived, nor do they possess a means for communicating information about the source of the image to the recipient. In many applications, the file for the image is stored on the user device, even when received multiple times, because there is no source information. Systems are needed that are able to capture from the user and convey the precise context of source information to recipients of an image as the image is forwarded on, as well as systems that are able to reduce storing the content multiple times.

Solutions to the problem described above include receiving, at a user device, a meme content item and updating the meme content item to include metadata about the source of the meme content item. In some embodiments, to update the metadata of the content item, a selection is received of an identifier tag. The identifier tag includes an indication of a source of the first meme content item. The indication of the source is a guess of the source for the content item that increases in confidence based on more selections being received. The user device then transmits the received selection to the server to include in the metadata for the first content item the identifier tag. In some embodiments, the server generates, based on the identifier tag, a history of user devices that received the first meme content item based on the identifier tag. For example, a number of selections may be received from a plurality of devices where the selections may be compared and grouped based on ranking or most common answer. In some embodiments, the application may generate a confidence score for the selection, the confidence score being indicative of the likelihood of the correctness of the selection, for example, receiving a selection of an identifier tag where multiple identical or similar selections have been provided. Multiple users have indicated that a clip is from the movie "Zoolander," and therefore, the confidence score for the selection increases. The identifier tag may include one or more metadata tags that identify at least one of an entity, an event, a location, and an object. Based on receiving at the user device a second content item, where the second content item is the same as the first content item, the system uses the identifier tags to replace the second content item with a link to the first content item. This process enables the application to populate the content item with source metadata from users. The user can determine the source to understand the context of the meme content item. Further, the application may provide a link to the location of the first content item saved in the server based on the comparing and finding matching identifier tags, thereby alleviating the processing power of the user device by avoiding storing the content item and not wasting storage with duplicate content items.

In some embodiments, to generate the link, an application may store the meme content item at the server with the identifier tags and, when receiving a meme content item with the same identifier tag, the application may search for the content item based on the identifier tag and provide a link to the content item. The application may then generate the link to the content item. In some embodiments, the link comprises a timestamp at which the frame appears in the video to enable the user to immediately access the relevant portion of the content item and understand the context of the image. In some embodiments, the metadata for the content item may be generated. For example, an interaction with the content item to determine the source may cause the metadata to appear in the content item to enable the user to understand the image's context immediately. The application may monitor user activity for interaction with the image. An interaction may be, for example, a click, a tap, a double-tap, a press, or a swipe. Once an interaction is detected, the application may provide the metadata for the content item.

In some embodiments, based on determining that the user device has previously received a meme content item, a server may obtain and provide source information for the content item to be displayed upon request. For example, the server may receive a request from an application to annotate a content item with source metadata based on the received selection for the user device. In response to the same content item being forwarded to the user device, the server may then search for a content item in the server that matches the content item received and forward a link to the content item. The server may then generate a link to the content item having a timestamp of the frame. Finally, the server may send the link to the application in place of the meme content item. In some embodiments, the server may send a notification including the link to the application that alerts the user that this was previously sent to the user device and the user should click on the link to view it again. The link may then be followed in response to user interaction with the notification in order to generate for display the content item beginning at the timestamp. This process enables a server to obtain, store and provide source information about the content item.

In some embodiments, the application or server may identify and provide multiple selections to multiple sources matching the content item. In some embodiments, in response to receiving the meme content item with little or no metadata, the application may prompt the user of the user device to indicate the source information. In some embodiments, the source may be entered via a manual entry on the application. In some embodiments, manual input into a window associated with providing a selection may be saved in the database while the personal content maintains an encryption wall for security. In some embodiments, the prompt may provide options to select. For example, the multiple sources may be different providers of the same content matching the content item. In some embodiments, the multiple sources may each have a variation of the content item matching the content item. The application or server may store each of the received selections and generate a link to each of the content items that is forwarded to the user device based on source information in the metadata and provide a link to the user based on user permissions to the sources, relevance, user preferences, or any other criteria. In some embodiments, the application or server may update the multiple links in the metadata when additional selections are received as to the sources of the content item.

It should be noted that the systems and methods described herein for one embodiment may be combined with other embodiments as discussed herein.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are described herein for populating content items' metadata with source information. When a content item is exchanged within an application, the content item may not include information about the source of the content item, much less about the characteristics. By selecting the content item, the user who is sending the content item via the user device may provide information that is indicative of the source of the content item. For example, the user may enter via the device that the content item is a video from a particular show or movie. In some embodiments, the application may provide options for selecting the possible source of the content item. In some embodiments, the application may analyze the content and ask for descriptions of the defining characteristics that it is trying to convey. For example, objects, actions, or contexts within the content item that the sender conveys may not be clear from simply looking at the content item. The system updates the metadata for the content item with the identified tags, including identified tags of the characteristics, and may store the content item in a storage database based on the determined characteristics. Once the system stores the content item in the server (e.g., in the cloud), the system may track which device has received the content item, and in response to the same content item being forwarded to the device, the server may transmit a link to the device instead of the content item. The selectable link may include a notification that the user previously received the content item and to view it again, the user should click on the link. Further, when viewing the content item, performing any action with the content item may lead to display of the metadata related to the content item. This will eliminate wasting storage space and permits the device to operate more efficiently without clogging up processing and storage capacity. If the user subsequently interacts with the content item (e.g., clicks to request source information), the system will follow the link to generate for display the source content.

Figure 1:
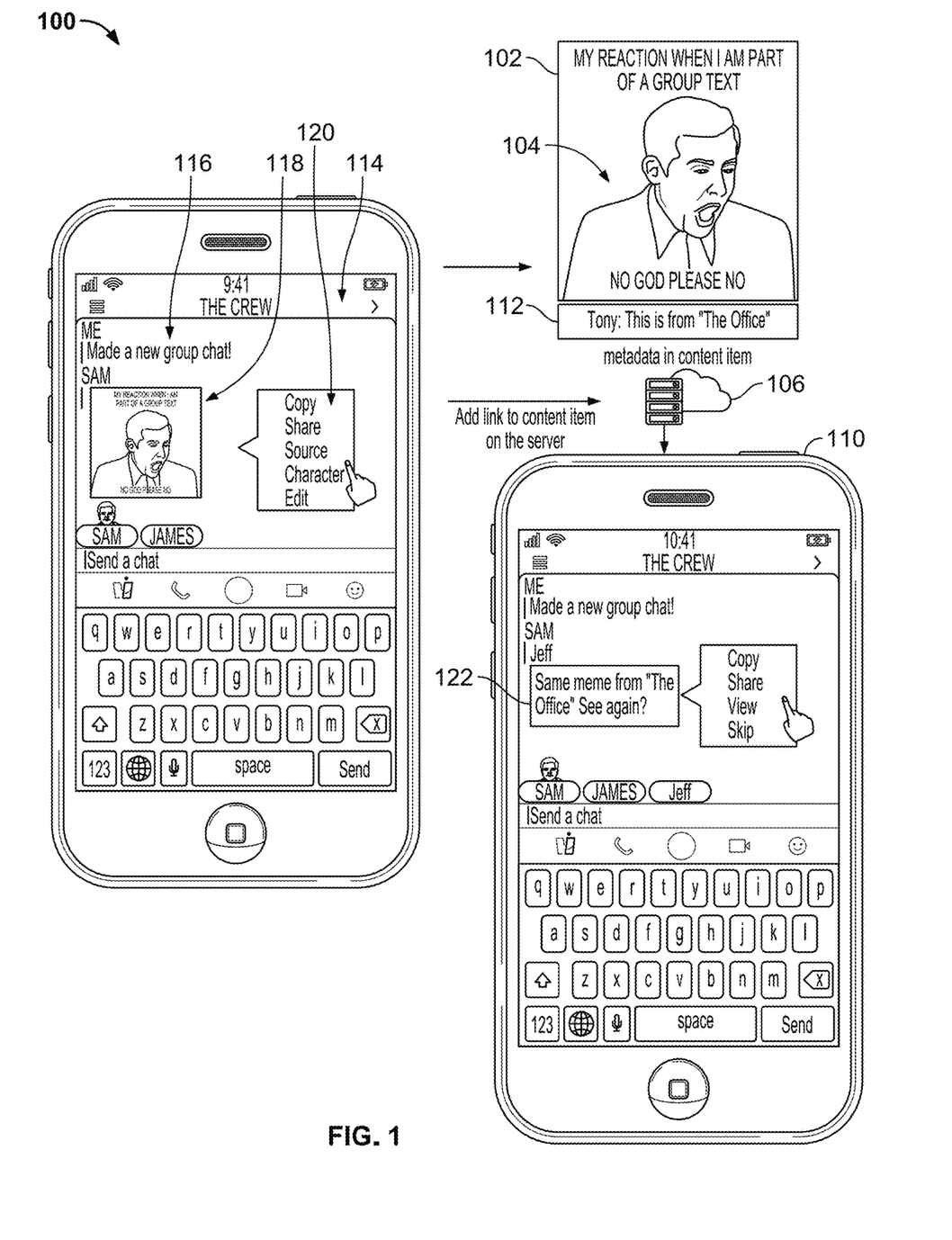
FIG. 1 shows an illustrative example of updating metadata of a content item with source information, in accordance with some embodiments of the disclosure.

FIG. 1 shows an illustrative example of populating metadata of an image with source information, in accordance with some embodiments of the disclosure. In FIG. 1, the system 100 (e.g., an application) accesses a content item 102 (e.g., comprising a meme content item), Content item 102 may include a screenshot 104 from a show (e.g., "The Office") with text added to the screenshot 104. Content item 102 does not include any source information for image or screenshot 104. The system 100 receives the option to provide a selection of the source of the content item at the user device. Additionally, the system 100 may receive at the user device information about the characteristics to identify the characteristics of the content item. For example, the system 100 may receive selections that identify objects within content item 102. In content item 102, the system 100 may identify a person (e.g., character Michael Scott from "The Office") in screenshot 104. In some embodiments, based on receiving the identifier tags, the system may update the content item at a server to include the received identifier tags. In some embodiments, the system may identify identifier tags of other characteristics within the content item based on the received input from the user device, such as actions, contexts, themes, any other characteristics, or any combination thereof.

Once the system 100 receives the identifier tags for content item 102, the system 100 may update the server 106 to store the content item and the source content corresponding to the content item. The server (e.g., server 106) may include a database of content items or may be able to access multiple external databases of content. In some embodiments, the system may use image comparison techniques such as frame comparison, object recognition, image analysis, any other form of image comparison, or any combination thereof. Based on some identified objects in the content item, the system may provide options for the user to enter to provide an indication of the source. In some embodiments, the system may determine, based on receiving a plurality of selections from user devices, a confidence match threshold (e.g., 80%), above which the system will determine the content item to be matching and below which the system will determine the content item requires additional input, by way of receiving a selection via the user device. In some embodiments, the content item may be a cropped version of the frame. In this instance, the system may compare the image to a portion of the frame that corresponds to the content item. The system may perform additional analyses upon receiving a selection from the user device to improve the confidence in the selected source content as described above.

Once the system 100 receives a selection of content source for the content item 102, for example, a manual entry 112 is inputted from Tony, "This is from 'The Office,'" which corresponds to the content item, the system 100 may update the metadata for the content item with the inputted selection or a back-end service may create a unique ID the first time the content item is shared. For example, the first time a meme is selected and added to a message, a unique ID is generated and associated with the meme, or an invisible watermark can be inserted into the content item being shared during transit (e.g., at a server). In some embodiments, the system may store the user device information to track which devices have viewed the content item and which devices are new. The system may store the content item in the database for further presentation and sharing with other users. In some embodiments, as the content item is reshared with the user device (e.g., user device 110) already listed in the database as having previously received the content item, the system then generates a link (e.g., link 122) to the content item and prompts the user device to provide input. For example, the user device 110 may receive a selection to view the content item again or skip it via link 122 including prompt "Same meme from 'The Office.' See again?"). In some embodiments, the content item may appear as a blurry image which needs to be tapped or clicked on for it to be downloaded to the user device. The system 100 then adds link 122 to the metadata of content item 102. Further, when the user receives the content item again, the link is displayed on the user device 110 for user selection. The link may include a location of content item 102 on the server and the metadata that was previously received at the user device 110 and any other identifying information.

In some embodiments, content item 102 is shared within an application (e.g., application 114) as a meme (e.g., meme 118). In some embodiments, application 114 may be a messaging application, a social media application, a communications application, a news application, or another type of application. In some embodiments, application 114 may perform the steps of determining that no source information is available and prompt recipients to input a source content item. In some embodiments, application 114 may perform the steps of storing the content item in a database, tracking the user device that previously received the content item and generating a link for user devices that previously received the content item. In some embodiments, server 106 may perform all or some of these steps. In application 114, a first user types a message (e.g., message 116) indicating that the user has created a new group chat. In response, a second user shares meme 118, which is related to message 116. If a received meme 118 in the group chat does not contain any information about the content of meme 118, the user who receives the meme 118 may interact with the content item (e.g., click, tap, double-tap, press, or swipe) in order to bring up a menu of options (e.g., menu 120). In some embodiments, menu 120 may include an option (e.g., option 120) to view the "Source." In some embodiments, interacting with option 120 causes the application to provide an option to enter source or any other information in order to generate for display the content item 102, which is a video. The system may then update the metadata of the content item 102 based on the received selection from the user device. In some embodiments, the video is generated for display on the same device where meme 118 was displayed (e.g., in the same application or in a different application). Upon a user device (e.g., device 110) receiving the same meme a second time from the same or different user, the system may search the history of user devices that have previously received the content item. In response to being on the list, the application generates a link (e.g., link 122) to the version saved on the server with an option for the user to view the meme again.

It will be understood that FIG. 1 is shown for illustrative purposes and that not all of the features need to be included. In some embodiments, additional features may be included as well.

Figure 2:
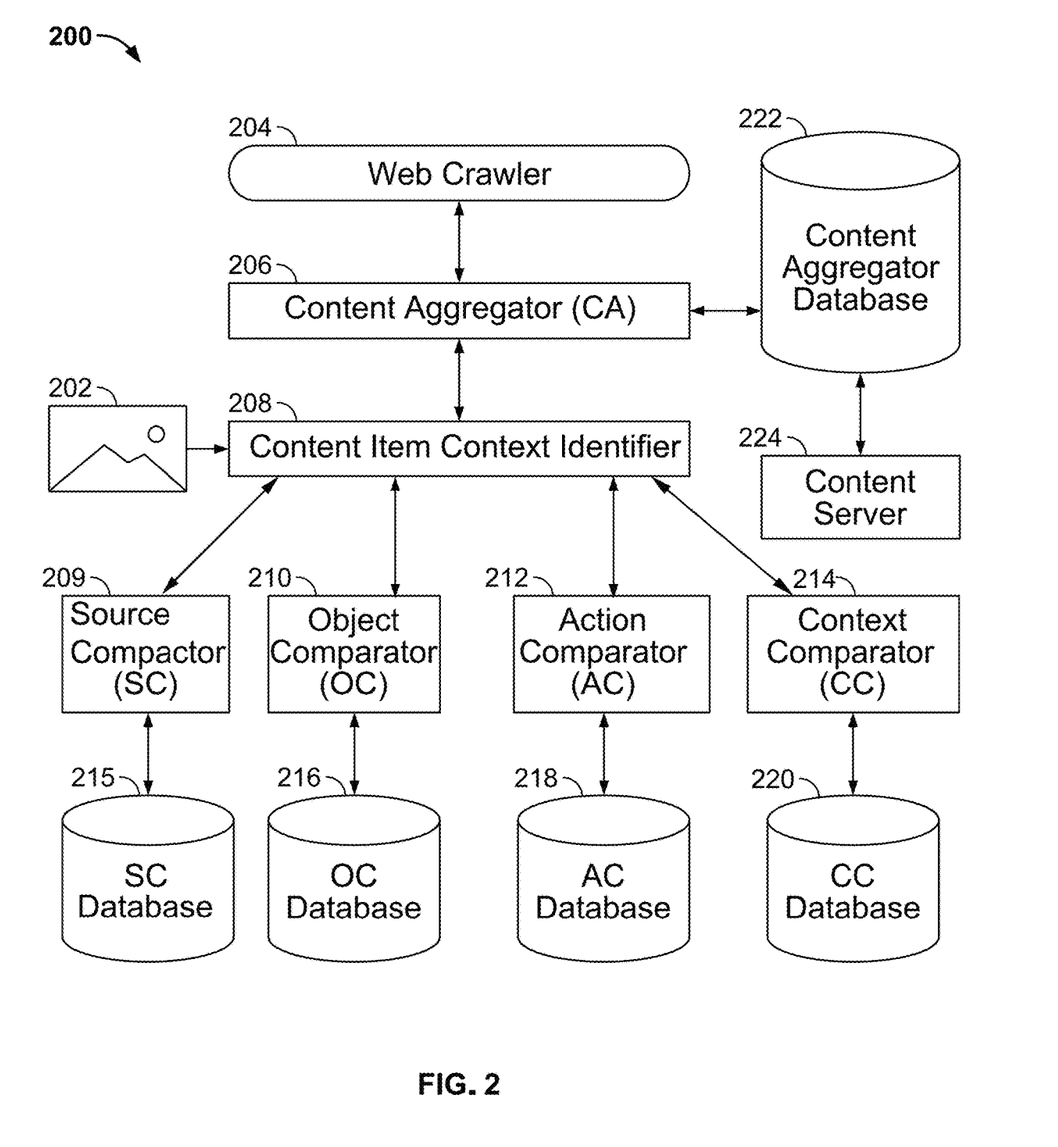
FIG. 2 shows an illustrative example of a system for receiving and updating source metadata for a content item, in accordance with some embodiments of the disclosure.

FIG. 2 shows an illustrative example of a system for obtaining and updating source metadata for an image, in accordance with some embodiments of the disclosure. The system includes an image context identifier that is configured to receive an image file (e.g., content item file 202). In some embodiments, the image file may be a meme, GIF, still image, screenshot, or any other type of image file. The content item context identifier 208 may receive selections from a user device and, based on a confidence score (e.g., from multiple same selections) for the content item, may be configured to identify the source of the content item. The source may be based on multiple users providing a selection of the source within the content item file, an action performed within the content item, or a context of the content item. Content item context identifier 208 may utilize a source compactor (e.g., source compactor 209), an object comparator (e.g., object compactor 210), an action comparator (e.g., action comparator 212), or a context comparator (e.g., context compactor 214) in order to identify a source and context for the content item. In some embodiments, source compactor 209 may access a source compactor database (e.g., SC database 215). The SC database 215 may include a number of sources to which the source compactor 209 can compare the content item file 202. In some embodiments, a number of selections are received at the user device. The sources may include movies, shows, characters, people, shapes representing objects, words, or any other objects. Based on receiving a repeated selection of the source from a plurality of devices, the source compactor 209 may determine that the source is the selection with most responses. In some embodiments, object compactor 210 may access an object comparator database (e.g., OC database 216). The OC database 216 may include a number of objects with the selection with most responses to which the object comparator 210 can compare the content item file 202. The objects may include characters, people, shapes representing objects, words, or any other objects. Object compactor 210 may receive a selection of an object, which may be stored within OC database 216, which matches other received selections within the content item file 202. For instance, as in FIG. 1, the object compactor 210 may identify the actor Steve Carell as an object in the image. In some embodiments, the content item context identifier 208 receives context identifiers to utilize the action compactor 212 to identify action in the content item with other received selections of action in the action comparator database (e.g., AC database 218). In some embodiments, the content item context identifier 208 may utilize the context compactor 214 to identify a conversation, post, article, video, or other content by reviewing the received selection of context and comparing it in a context comparator database (e.g., CC database 220), which included the content item file 202. Based on descriptions or discussions of the content item file 202 in the CC database 220, the context comparator 214 may be able to extract a context.

The content item context identifier 208 sends information about the received selections (e.g., from the source compactor 209, object comparator 210, action comparator 212, or context comparator 214) to a content aggregator (e.g., content aggregator 206). In some embodiments, the content aggregator 206 may utilize a web crawler (e.g., web crawler 204) in order to confirm the received selections based on a limited search to the items received for content corresponding to the content item file 202 in a database of content (e.g., content aggregator database 222). In some embodiments, the content aggregator 206 may search content aggregator database 222 using the objects, actions, and contexts received from the user device by any of the compactors or any combination thereof.

In some embodiments, the content item context identifier 208 may receive source information from the web crawler. The source link in the metadata of content item file 202 may be updated to the stored location on the server. In some embodiments, the source information may be a provider, or multiple providers, that make available a video having a frame that corresponds to the content item file 202. In some embodiments, the source information may be a location at which the source content is stored. In some embodiments, the content item context identifier 208 sends the updated source information to a content server (e.g., content server 224). The content server 224 may store the source information such that it may provide the source information if a similar content item file should enter the system in the future.

It will be understood that diagram 200 is merely illustrative and that various modifications can be made in accordance with the present disclosure.

Figure 3:
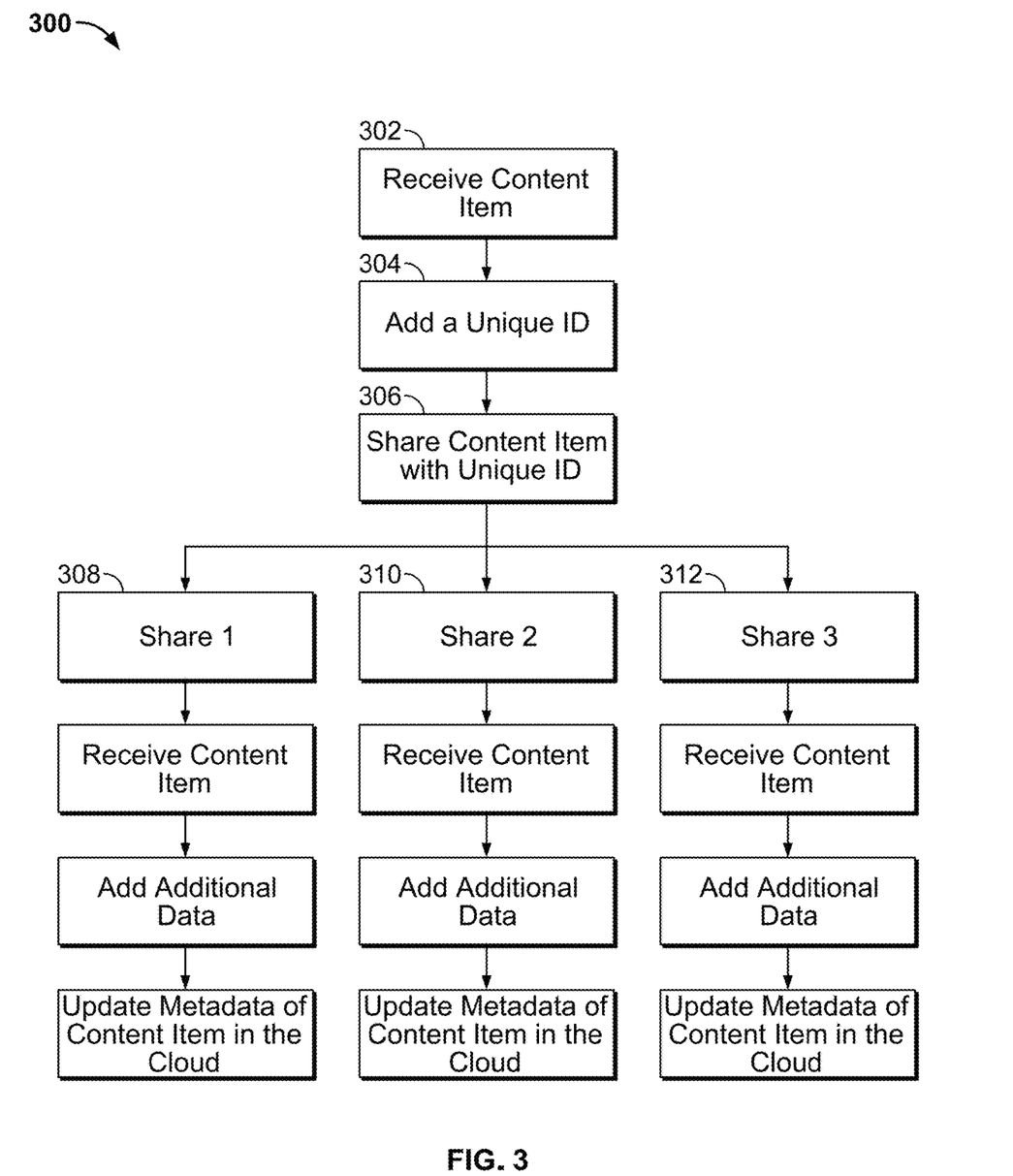
FIG. 3 shows an illustrative example of a system for updating source metadata for a content item and sharing the content item where further information is updated, in accordance with some embodiments of the disclosure.

FIG. 3 shows an illustrative example of a system for updating source metadata for a content item and sharing the content item where further information is updated, in accordance with some embodiments of the disclosure. In the illustrative example, a content item (e.g., meme) is received 302 at a user device via an application (e.g., messaging app). Based on receiving the content item (e.g., sharing the meme) at the user device, the user of the user device may add a unique ID 304 as to the source of the content item or any other feature of the content item or a back-end service creates a unique ID the first time the meme or content item is shared. In some embodiments, an invisible watermark can be inserted into the content item being shared during transit (e.g., at a server). The watermark can also be a personal watermark associated with the user (e.g., user's own "memoji"). As the meme is forwarded on and on to different recipients, users are automatically presented with an option to suggest the source of the meme. If the meme is simply a text such as "Happy Birthday" or other flashy animation, where it is determined that it is not unlikely to be associated with a media source such as a movie or TV series, then the user is not prompted to enter any information. Only the input typed by the recipient gets associated with the unique ID and the user's private messages in a chat window are not shared with the tracking service since these messages could be confidential. In some embodiments, a machine learning model (on the device) can suggest the name of the meme based on the context of the message (if such information can be discerned). For example, if the message mentions the popular movie "Vampire's Kiss," and a meme is shared by any of the recipients, then an auto-suggest can be displayed for the user to select. Specifically, the text box where the recipient can enter a suggestion is part of the meme (from a user interface UI perspective—e.g., under the meme). In some embodiments, the meme becomes an "electronic form" within the chat window, and a suggestion(s) entered by the users are sent back to a server and associated with the unique ID of the short clip or the meme.

In some embodiments, the application or server may update the metadata of the content item to include the said unique ID received. The user of the user device may then share the content item with the unique ID. In some embodiments, the application can also perform audio analysis on the content item to determine if it was a speech or a song in the content item and, based on that, the application can make intelligent keyword extractions to identify the source options. In some embodiments, the unique ID being associated with the meme or short video also tracks which accounts the meme or short clip was sent to; then the unique ID is used to prevent the same video from being forwarded to the same user. For example, a notification that references the video is sent to inform the user that this is a video they've received before. In some embodiments, the sender can also be informed that the intended recipient has already been sent the video. In response, the system may allow the generation of an automatic message to be sent to the intended recipient. In some embodiments, the system may further send the video to the server but only forward it to the recipient if the automated message cannot find or cannot be linked to the video on the recipient's device because the video has been deleted.

The content item, including the added unique ID, is then shared 306 with other recipients. Based on the content item being further shared, the system tracks each user device that receives the content item and the selections that are received from each device. For example, the first share 308 includes a user device that performs the steps of receiving the content item and adding additional information (to increase confidence), and the system updates the metadata of the content item accordingly. This is repeated each time the content item is shared (310, 312, etc.), until a confidence score for the information has reached a level high enough to avoid further inputs. For example, receiving a 90% of data that is the same provides confidence that the data (e.g., source information) is correct.

As the application receives selections of the source of the content item via the user device, the received selections are ranked at a server and can be populated for the next user(s) that the meme is forwarded to. For example, tapping the meme can retrieve the metadata including the source information, up to a certain time, as a top selection, and the user can also cycle through or retrieve other top-ranked choices. The ranks can be based on the number of similar selections. Additionally, when it's detected that two suggestions are close to each other (in terms of the number of people who suggested them), the algorithm can stop allowing users (via a user device) to enter their own suggestions and instead present the top two selections and ask the users to select one of them.

It will be understood that diagram 300 is merely illustrative and that various modifications can be made in accordance with the present disclosure.

Figure 4:
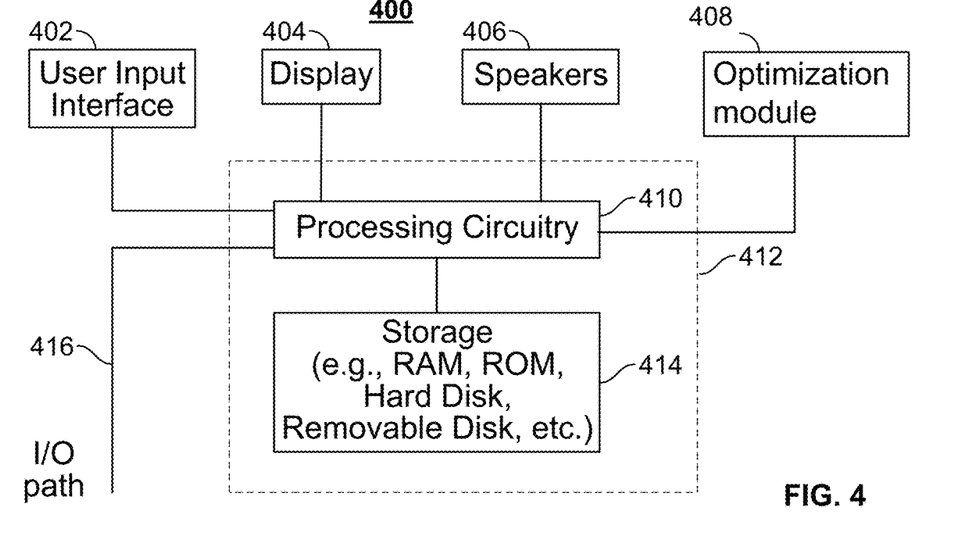
FIG. 4 is a block diagram of illustrative user equipment, in accordance with some embodiments of the present disclosure.

FIG. 4 shows a generalized embodiment of illustrative media device 400. As depicted, the media device 400 may be a smartphone, tablet, a set-top box, CPU, video-game console, etc.) powered by processor 410. Media device 400 may receive content and data via input/output (hereinafter "I/O") path 416. I/O path 416 may provide content (e.g., broadcast programming, on-demand programming, Internet content, content available over a local area network (LAN) or wide area network (WAN), and/or other content) and data to control circuitry 412, which includes processing circuitry 410 and storage 414. Control circuitry 412 may be used to send and receive commands, requests, and other suitable data using I/O path 416. I/O path 416 may connect control circuitry 412 (and specifically processing circuitry 410) to one or more communications paths (described below). I/O functions may be provided by one or more of these communications paths, but are shown as a single path in FIG. 4 to avoid overcomplicating the drawing.

Control circuitry 412 may be based on any suitable processing circuitry such as processing circuitry 410. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 412 executes instructions for populating image metadata based on settings stored in memory (e.g., storage 414).

In client/server-based embodiments, control circuitry 412 may include communications circuitry suitable for communicating with a video content server or other networks or servers. The instructions for carrying out the above-mentioned functionality may be stored on a server. Communications circuitry may include an integrated services digital network (ISDN) modem, Ethernet card, or a wireless modem for communications with other equipment or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 414 that is part of control circuitry 412. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 5, may be used to supplement storage 414 or instead of storage 414.

Control circuitry 412 may include video generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 412 may also include scaler circuitry for upconverting and downconverting content into the preferred output format of the media device 400. Circuitry 410 may also include digital-to-analog converter circuitry and analog-to-digital converter circuitry for converting between digital and analog signals. The tuning and encoding circuitry may be used by the media device to receive and to display, play, or record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general-purpose or specialized processors. Multiple tuners may be provided to handle simultaneous tuning functions. If storage 410 is provided as a separate device from media device 400, the tuning and encoding circuitry (including multiple tuners) may be associated with storage 410.

A user may send instructions to control circuitry 412 using user input interface 402 of media device 400. User input interface 402 may be any suitable user interface, such as a remote control, mouse, trackball, keypad, keyboard, touch screen, touchpad, stylus input, joystick, voice recognition interface, or other user input interfaces. Display 404 may be a touchscreen or touch-sensitive display. In such circumstances, user input interface 402 may be integrated with or combined with display 404. Display 404 may be provided as a standalone device or integrated with other elements of media device 400. Speakers 406 may be provided as integrated with other elements of media device 400. In the case of media device 400, speakers 406 may be standalone units (e.g., smart speakers). The audio component of videos and other content displayed on display 404 may be played through speakers 406. In some embodiments, the audio may be distributed to a receiver (not shown), which processes and outputs the audio via speakers 406.

The metadata population may be implemented using any suitable architecture. For example, it may be a standalone application wholly implemented on media device 400. The metadata population and/or any instructions for performing any of the embodiments discussed herein may be encoded on computer-readable media. Computer-readable media includes any media capable of storing data. In some embodiments, the metadata population is a client/server-based application. Data for use by a thick or thin client implemented on media device 400 is retrieved on-demand by issuing requests to a server remote to the media device 400. For example, media device 400 may receive inputs from the user via input interface 402 and transmit those inputs to the remote server for processing and generating the corresponding outputs. The generated output is then transmitted to media device 400 for presentation to the user.

Figure 5:
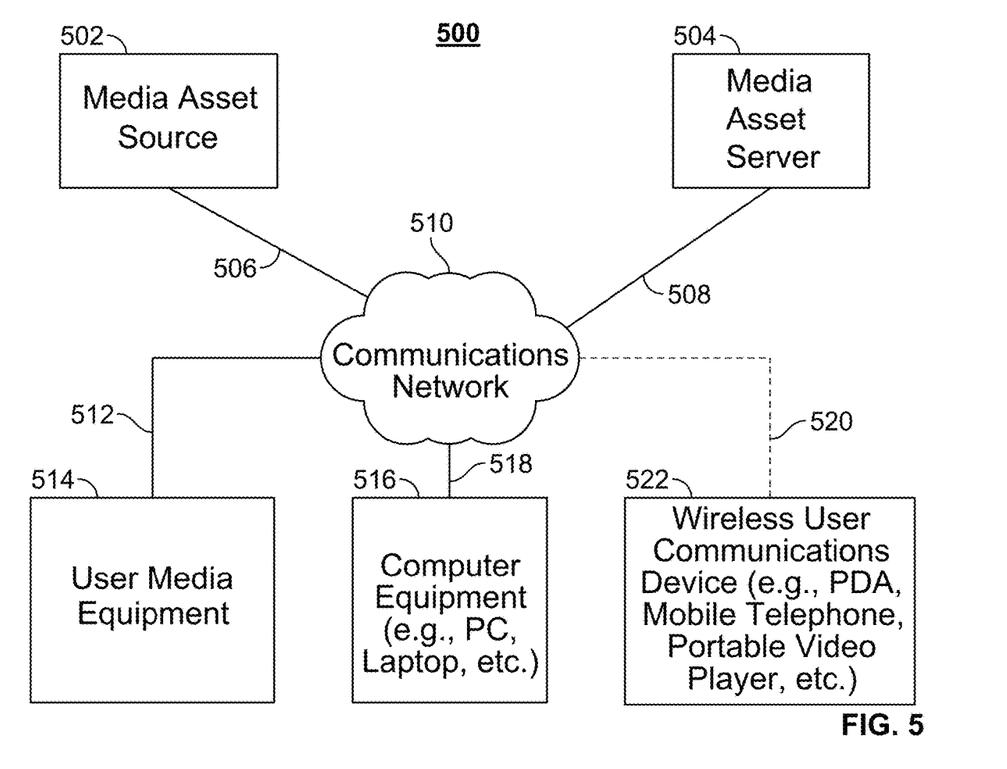
FIG. 5 is a block diagram of an illustrative media system, in accordance with some embodiments of the disclosure.

Media device 400 of FIG. 4 can be implemented in system 500 of FIG. 5 as user media equipment 514. Media devices, on which metadata population may be implemented, may function as a standalone device or may be part of a network of devices. Various network configurations of devices may be implemented and are discussed in more detail below.

In system 500, there may be multiple media devices, but only one of each is shown in FIG. 5 to avoid overcomplicating the drawing. In addition, each user may utilize more than one type of media device and also more than one of each type of media device. FIG. 5 depicts exemplary systems, servers and related hardware for providing summaries of multiple contents from group watching a concurrent presentation, in accordance with some embodiments of the disclosure. A user equipment device utilizing at least some of the system features described above in connection with FIG. 5 may not be classified solely as user media equipment 514, computer equipment 516, or a wireless user communications device 522. For example, user media equipment 514 may, like some computer equipment 516, be Internet-enabled, allowing for access to Internet content, while wireless user computer equipment 522 may, like some user media equipment 514, include a tuner allowing for access to media programming. The user interface application may have the same layout on various types of user equipment or may be tailored to the display capabilities of the user equipment. For example, on wireless user computer equipment 516, the user interface application may be provided as a website accessed by a web browser. In another example, the user interface application may be scaled down for wireless user communications devices 522.

The user equipment devices may be coupled to communications network 510 via one or more communication paths including paths 512, 518, 520. Communications network 510 may be one or more networks including the Internet, a mobile phone network, mobile voice or data network (e.g., a 4G, 5G or LTE network), cable network, public switched telephone network or other types of communications network or combinations of communications networks.

System 500 includes media asset source 502 and content reaction data source 504 coupled to communications network 510. Communications with the media asset source 502 and the data source 504 may be exchanged over one or more communications paths but are shown as a single path (e.g., paths 506, 508) in FIG. 5 to avoid overcomplicating the drawing. Although communications between sources 502 and 504 with user equipment devices 514, 516, and 522 are shown through communications network 510, in some embodiments, media asset sources 502 and media guidance data source 504 may communicate directly with user equipment devices 514, 516, and 522.

Media asset source 502 may include one or more types of content distribution equipment including a media distribution facility, satellite distribution facility, programming sources, intermediate distribution facilities and/or servers, Internet providers, on-demand media servers, and other content providers. Media guidance data source 504 may provide content data, such as the audio described above. Media content interface application data may be provided to the user equipment devices using any suitable approach. In some embodiments, media content interface data from media guidance data source 504 may be provided to users' equipment using a client/server approach. For example, a user equipment device may pull content data from a server, or a server may present the content data to a user equipment device. Media guidance data source 504 may provide user equipment devices 514, 516 and 522 the content reactions received from user equipment devices 514, 516 and 522 or any other user devices including the interface application itself or software updates for the user interface application.

Figure 6:
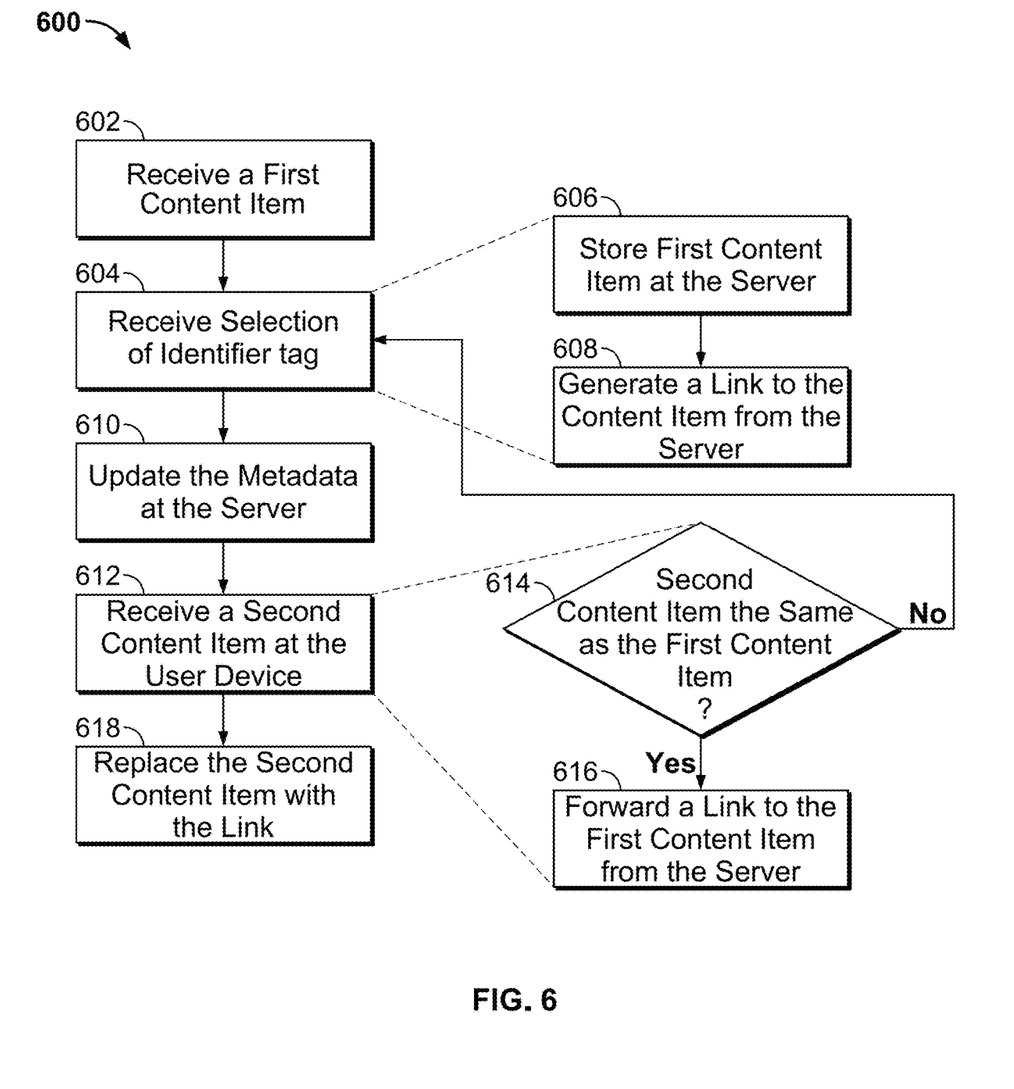
FIG. 6 is a flowchart of an illustrative process for providing, via an application, a link to a video corresponding to an content item, in accordance with some embodiments of the disclosure.
Figure 7:
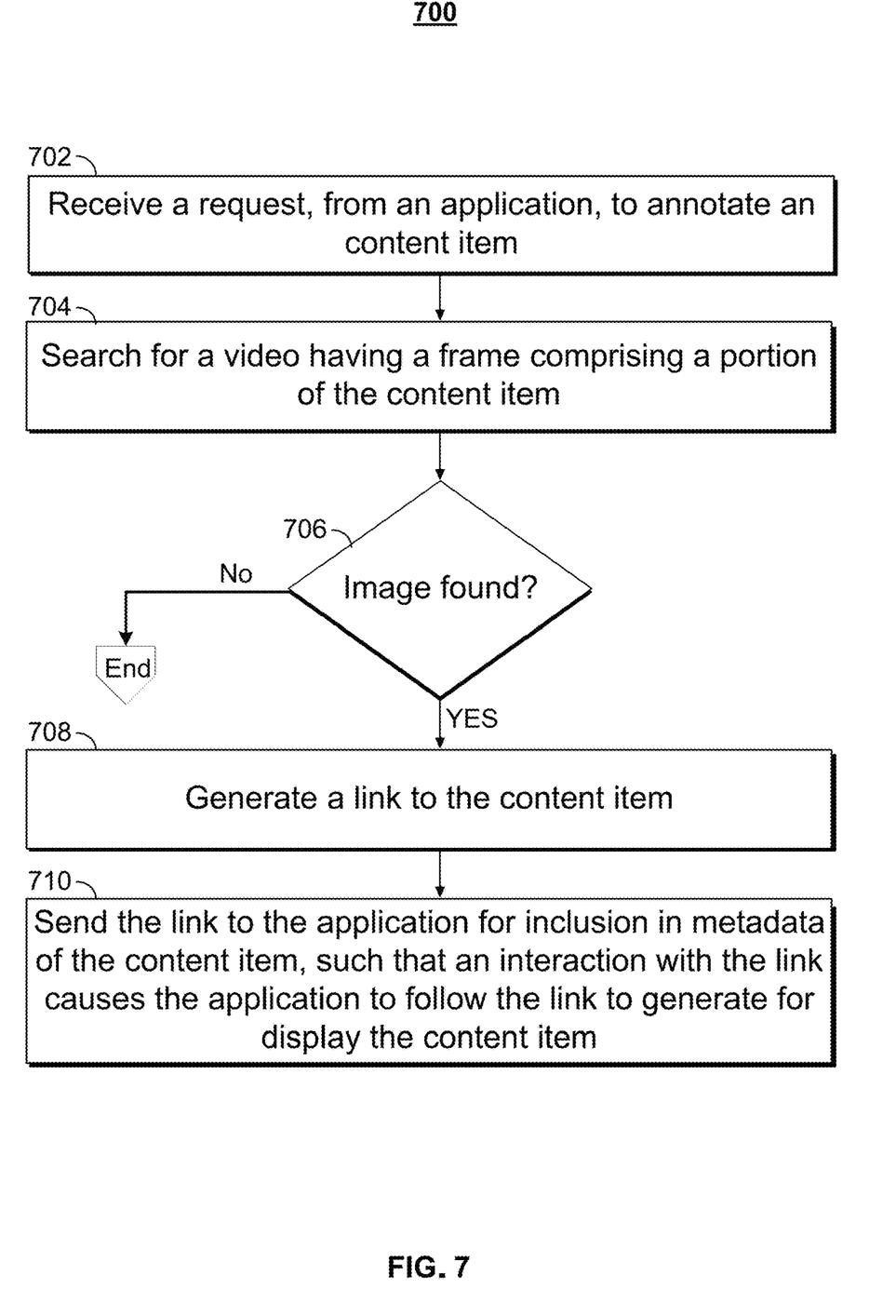
FIG. 7 is a flowchart of an illustrative process for providing, via a server, a link to a video corresponding to an image, in accordance with some embodiments of the present disclosure.
Figure 8:
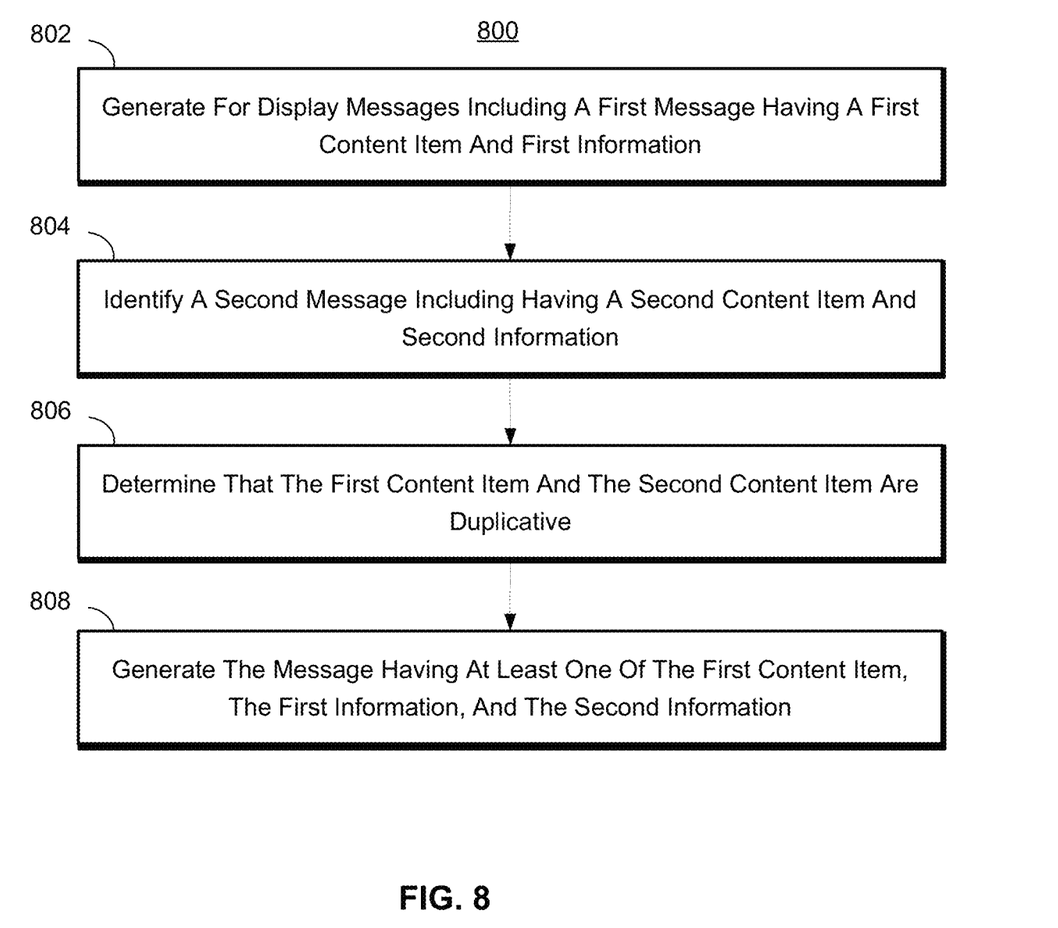
FIG. 8 is a flowchart of an illustrative process for determining if the content items are duplicates, in accordance with some embodiments of the disclosure.

It is contemplated that the steps or descriptions of FIGS. 6-8 may be used with any other embodiment of this disclosure. In addition, the steps and descriptions are described in relation to FIGS. 6-8 may be done in alternative orders or in parallel to further the purposes of this disclosure. Any of these steps may also be skipped or omitted from the process. Furthermore, it should be noted that any of the devices or equipment discussed in relation to FIGS. 4-5 could be used to perform one or more of the steps in FIGS. 6-8.

FIG. 6 is a flowchart of an illustrative process for providing, via an application, source information for the content item, in accordance with some embodiments of the disclosure. As shown in FIG. 6, process 600 receives a content item via an application running a user device with no corresponding source information and updates the metadata of the content item to include the source information and a link to the content item. When a subsequent interaction with the content item is detected or when a repeated transmission of the content item to the device is detected, the application can follow the link in order to display the video.

At step 602, the application (e.g., using control circuitry 404) receives a first content item. In some embodiments, the first content item may be an image (e.g., meme, GIF, still image, video, etc.) that has been shared within the application.

At step 604, the application receives a selection of the identifier tags. The identifier tags may be based on the source, characters, context or a combination thereof. The selection is based on the user providing feedback to the application to improve the information about the content item of the image, which may be performed by the process outlined in steps 606 and 608 or by any other means.

At step 606, the system stores the first content item (e.g., using network 510) in the server, for easy access at a later time. Additionally, metadata corresponding to the content item and the user device is stored. In some embodiments, the system may store in a database of content items (e.g., stored on server 504) to analyze content items and the other devices that have received the content item. The system may use any technique to analyze and compare the content item to determine the source, such as frame comparison, object recognition, image analysis, any other form of image comparison, or any combination thereof. For example, the system may determine a confidence score for the received selection based on a threshold of repeated selections (e.g., 90%), above which the system will determine the content item to be from the source. In some embodiments, the system may perform any of the analyses described above to determine the selections received and improve the accuracy of the source of the content item. In some embodiments, if the content item comprises overlaid text (e.g., such as in a meme), the system may remove the text from the content item before displaying it for the user device to provide a selection. In some embodiments, the device may perform a search for a most likely source, for example, through the use of a neural network. For example, the neural network may be trained by adding text to an image, feeding the modified image through the neural network and adjusting the neural network based on how closely the output of the neural network resembles the original image (before text addition).

At step 608, the system generates the link to the content item. In some embodiments, the content item is stored on the server, and the link is to the version stored on the server. That is, even determining the source of the content item, the user may be restricted from viewing the content and therefore, the content item is stored on the server for future playback. The link may also include information about the video source, the location in the server at which the content item is stored, any other source information, or any combination thereof.

At step 610, the application updates the metadata of the content item stored on the server for any interactions with the content item. The selections of source and context may be updated for the content item for future access. For example, by clicking or tapping the content item after being updated, the user may be prompted with the source of the content item (e.g., "The Office") and the context of the content item (e.g., sarcasm). In some embodiments, an interaction may be a click, a tap, a double-tap, a press, or a swipe. For example, as in FIG. 1, a user may right-click on the image in order to access a menu of options for the content item.

At step 612, the application receives a second content item at the user device. For example, the application may receive the same content item that was forwarded from another user. If the system detects that the second content item is a unique content item received at the user device for the first time, process 600 reverts to step 604. The determination is based on comparing the content items, which may be performed by the process outlined in steps 614 and 616 or by any other means.

At step 614, the system determines (e.g., using network 510) if the first content item and the second content item in the server are the same. The system compares the metadata corresponding to the second content item and the user device to determine if the content item was previously delivered to the device. In some embodiments, the system may store in a database of content items (e.g., stored on server 504) to analyze the content item and the other devices that have received the content item. The system may use any technique to analyze and compare the content items to determine if the content items are repeated, such as frame comparison, object recognition, image analysis, any other form of image comparison, or any combination thereof. In some embodiments, if the content item comprises overlaid text (e.g., such as in a meme), the system may remove the text from the content item before comparing the content items to determine if they are the same. If the application determines the first content item is the same as the second content item ("Yes" at 614), then, at 616, the application forwards a link for the first content item to the user device. If, on the other hand, the application determines the first content item is not the same as the second content item ("No" at 614), then the application reverts back to 604 to receive a selection of identifier tags.

At step 616, the system forwards the link to the user device from the server. In some embodiments, the content item is stored on the server, and the link is to the version stored on the server. That is, even determining the source of the content item, the user device may be restricted from viewing the content and, therefore, the content item is stored on the server for future playback.

At step 618, the application replaces the second content item on display with the link that is directed to the first content item. In some embodiments, the application may provide an option for the user to receive the content item and, in response to receiving approval, may launch an alternate application in which the video is located. For example, the video may be streamed on device 514 via network 510 from media asset server 504.

It will be understood that process 600 is merely illustrative and that various modifications can be made in accordance with the present disclosure.

FIG. 7 is a flowchart of an illustrative process for providing, via a server, a link to a video corresponding to a content item, in accordance with some embodiments of the present disclosure. As shown in FIG. 7, process 700 stores the video of the content item (e.g., using network 510) received at the user device, which includes the updated metadata received from the user device. The server then generates a link to the stored video and includes in the link metadata about the context and source of the video. The server sends the link to the application for inclusion as part of the message or communication that the user device initially received.

At step 702, the server receives a request, from an application, to update a content item. In some embodiments, the server may receive the update in response to the content item being shared within the application. In some embodiments, the server may receive the update in response to user interaction with the content item within the application (e.g., via user input interface 402).

At step 704, the server searches (e.g., using network 510) for a content item having a frame comprising a portion of the content item. In some embodiments, the system may access a database of content items (e.g., stored on server 504) in order to analyze content items for frames corresponding to the content item. The server may use any techniques to analyze and compare the image to the frames of content items, such as frame comparison, object recognition, image analysis, any other form of image comparison, or any combination thereof. In some embodiments, if the image comprises overlaid text (e.g., such as in a meme), the system may remove the text from the image before performing the search, for example, through the use of a neural network.

At step 706, the server determines if a content item is found as previously being presented to the user device. If a content item is found, process 700 proceeds to step 708. If no content item is not found, process 700 ends.

At step 708, the server generates a link to the video stored at the server, where the link includes metadata as part of the link. The link may additionally include information about the source of the video, the location at which the video is stored, any other source information, or any combination thereof.

At step 710, the server sends the link to the application for inclusion in the metadata of the image, such that interaction with the image causes the application to follow the link to generate for display the video. In some embodiments, the link may launch an alternate application in which the video is located. For example, the video may be streamed on device 502 via network 510 from server 504.

It will be understood that process 700 is merely illustrative and that various modifications can be made in accordance with the present disclosure.

FIG. 8 is a flowchart of an illustrative process for generating personalized messages, in accordance with some embodiments of the present disclosure. For example, an application configured to perform process 800 may be implemented on any suitable hardware such as media device 400 of FIG. 4, any other suitable device, or any combination thereof. In a further example, the application may include the functionality of system 200 of FIG. 2, system 300 of FIG. 3, system 500 of FIG. 5, any other suitable functionality, or a combination thereof.

At step 802, the application generates messages having a first message that includes a first content item and first information. In some embodiments, the application includes a user interface that includes a timeline, a media feed, user-selectable soft buttons, text information, interactive objects, any other suitable visual components, or any combination thereof.

At step 804, the application identifies a second message that includes a second content item and second information. In an illustrative example, the messages might already include the second message (e.g., the second content item is already visible). In a further example, the second message might not be display yet, and the application considers the second message before adding to the messages.

At step 806, the application determines that the first content item and the second content item are duplicative.

At step 808, if the first content item and the second content item are duplicative, the application generates a combined message. The combined message includes the first content item, the first information, the second information, or a combination thereof. In some embodiments, the application generates the combined message by combining the first information and the second information to form composite information while omitting the content item. For example, the application may combine "likes," comments, descriptive information, metadata tags, followers, and other suitable information to generate a single, aggregated collection of information. In some embodiments, the application generates the combined message by generating a modified message that includes the combined content items with the combined information. For example, the application may generate a display on a display device that includes a timeline having messages.

In an illustrative example, the application may receive an indication to add the second message to the message feed. The indication may arise from user input, a transmission from another application or system, or the indication may be generated by the application (e.g., based on a timed schedule or any other suitable trigger). The application may determine relationship information between the first content item and the second content item in response to receiving the indication to add the second content item to the media feed. For example, the first metadata may be associated with the first content item, and the second metadata may be associated with the second content item, and the application may determine the relationship information based on comparing the first metadata and the second metadata. In some embodiments, determining the relationship information includes retrieving the relationship information from a database based on the first metadata and the second metadata. For example, the first and second metadata may be stored and retrievable from storage. The metadata may include one or more metadata tags that identify an entity, an event, a location, an object, or a combination thereof associated with the content. The application may determine whether the first content item and the second content item share the same source (e.g., creation by the same device, storage with the same filename, stored with the same metadata tags) to determine whether the content items are duplicative. In some embodiments, the application determines whether the first and second content items are duplicative by identifying one or more first objects of the first content item, identifying one or more second objects of the second content item, and comparing the one or more first objects to the one or more second objects. For example, the application may apply facial recognition to identify one or more objects or entities in each of the content items and then compare the identified objects and/or entities to determine whether there is a match.

It will be understood that process 800 is merely illustrative and that various modifications can be made in accordance with the present disclosure.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other example in a suitable manner, done in different orders, or done in parallel. In addition, the systems and methods described herein may be performed in real time. It should also be noted, the systems and/or methods described above may be applied to, or used in accordance with, other systems and/or methods.

As used herein, a "media item" is an element of content transmitted over a network such as the Internet to be consumed on a user device, which may include any computing device as described in this disclosure. A media item may include, without limitation, an image, a video, an audio file, and/or a textual file. A media item may include an item of a persuasive nature, such as, without limitation, an advertisement. A media item may include a banner advertisement, a "popup" advertisement, a "pop-under" advertisement, an advertisement that displays in a layer such as a layer in front of a web page, a redirected advertisement, a "splash screen" advertisement, or the like. A media item may include a "meme," a video forwarded between and/or from social media users, and/or platforms, or the like. A media item may include metadata such as owner, producer, time or place of creation, or the like. A media item may include a title. A "theme" of a media item is a subject matter that the media item is promoting, describing, or otherwise providing via its content. A "principal theme" as used in this disclosure is a "main point" or primary purpose of a media item. For instance, in an advertisement, a principal theme of the advertisement may be a product, service, and/or brand being promoted or sold thereby. A principal theme of a video, story, or meme may include the main character, subject matter, place, event, or other main focus of the video, story, or meme.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method comprising:
   receiving, at a user device, a first content item;
   in response to receiving, at the user device, the first content item:
      receiving, at a server from the user device, a selection of an identifier tag for updating metadata for the first content item, the identifier tag comprising at least one of an indication of a source and indication of context of the first content item;
      in response to receiving the selection for updating the metadata for the first content item, generating at the server, a confidence score for the selection, the confidence score being indicative of correctness of the selection;
      receiving, from a plurality of user devices, a number of selections of the identifier tag for updating the metadata for the first content item;
      increasing the confidence score based on the number of selections;

determining, based on receiving the number of selections of the identifier tag from the plurality of user devices, a confidence match threshold;
in response to determining that the confidence score is below the confidence match threshold, generating, at the server for the user device, a request for additional input for updating the metadata for the first content item; and
updating, at the server, the metadata for the first content item to include the identifier tag and a link to the first content item;
receiving, at the user device, a second content item;
comparing the first content item and the second content item;
determining, based on comparing the first content item and the second content item, that the second content item and the first content item depict a same image;
comparing metadata corresponding to the second content item and the user device;
determining, based on comparing the metadata corresponding to the second content item and the user device, that the user device has previously received the second content item as the first content item; and
in response to determining that (i) the second content item and the first content item depict the same image and (ii) the user device has previously received the second content item as the first content item, modifying the second content item on the user device to include a notification indicating that the same image was previously received at the user device, wherein the notification comprises the link to the first content item.

2. The method of claim 1, wherein receiving the selection of the identifier tag for the first content item comprises prompting for entry of the source, wherein the entry of the source is one of a manual entry or options to select.

3. The method of claim 1, further comprising:
storing the first content item in the server;
generating the link to the stored first content item;
based on receiving at the user device the second content item, determining that the received second content item matches the stored first content item from the server and deleting the received second content item from the user device; and
transmitting from the server the link to the stored first content item.

4. The method of claim 1, wherein the identifier tag comprises one or more metadata tags that identify at least one of an entity, an event, a location, and an object.

5. The method of claim 1, further comprising:
receiving, from one or more user devices, a plurality of selections for updating the metadata for the first content item;
determining, from the plurality of received selections for updating the metadata for the first content item, a ranking of the plurality of received selections; and
updating the metadata for the first content item with a highest ranked received selection from the ranking of the plurality of received selections.

6. The method of claim 1, wherein the identifier tag comprises text, and the method further comprises causing to present the identifier tag during a presentation of the first content item.

7. The method of claim 1, wherein receiving, at the user device, the selection of the identifier tag for the first content item comprises:
receiving an interaction, wherein the interaction is one of a click, a tap, a double-tap, a press, or a swipe;
in response to receiving the interaction, generating one or more options for the user device to update the metadata of the first content item; and
receiving from the user device a selection of the one or more options to update the metadata of the first content item.

8. The method of claim 1, further comprising:
searching a plurality of videos for a video frame corresponding to a portion of the first content item;
generating the link to a video from the plurality of videos that comprises the video frame corresponding to the portion of the first content item, wherein the link comprises a timestamp of the video frame in the video; and
in response to receiving at the user device the second content item, causing to present the link to the video that comprises the video frame.

9. The method of claim 1, wherein the identifier tag is a first identifier tag, the method further comprising:
receiving, at the user device, a second identifier tag with the second content item;
matching the first identifier tag and the second identifier tag; and
wherein determining that the user device has previously received the second content item as the first content item is further based on matching the first identifier tag and the second identifier tag.

10. A system comprising:
control circuitry configured to:
receive, at a user device, a first content item;
in response to receiving, at the user device, the first content item:
receive, at a server from the user device, a selection of an identifier tag for updating metadata for the first content item, the identifier tag comprises at least one of an indication of a source and indication of context of the first content item;
in response to receiving the selection for updating the metadata for the first content item, generating at the server, a confidence score for the selection, the confidence score being indicative of correctness of the selection;
receiving, from a plurality of user devices, a number of selections of the identifier tag for updating the metadata for the first content item;
increasing the confidence score based on the number of selections;
determining, based on receiving the number of selections of the identifier tag from the plurality of user devices, a confidence match threshold;
in response to determining that the confidence score is below the confidence match threshold, generating, at the server for the user device, a request for additional input for updating the metadata for the first content item; and
update, at the server, the metadata for the first content item to include the identifier tag and a link to the first content item;
receive, at the user device, a second content item;
compare the first content item and the second content item;
determine, based on comparing the first content item and the second content item, that the second content item and the first content item depict a same image;
compare metadata corresponding to the second content item and the user device;

determine, based on comparing the metadata corresponding to the second content item and the user device, that the user device has previously received the second content item as the first content item; and in response to determining that (i) the second content item and the first content item depict the same image and (ii) the user device has previously received the second content item as the first content item, modify the second content item on the user device to include a notification indicating that the same image was previously received at the user device, wherein the notification comprises the link to the first content item.

11. The system of claim 10, wherein the control circuitry is configured to receive the selection of the identifier tag for the first content item by prompting for entry of the source, wherein the entry of the source is one of a manual entry or options to select.

12. The system of claim 10, wherein the control circuitry is further configured to:
store the first content item in the server;
generate the link to the stored first content item;
based on receiving at the user device the second content item, determine that the received second content item matches the stored first content item from the server and delete the received second content item from the user device; and
transmit from the server the link to the stored first content item.

13. The system of claim 10, wherein the identifier tag comprises one or more metadata tags that identify at least one of an entity, an event, a location, and an object.

14. The system of claim 10, wherein the control circuitry is further configured to:
receive, from one or more user devices, a plurality of selections for updating the metadata for the first content item;
determine, from the plurality of received selections for updating the metadata for the first content item, a ranking of the plurality of received selections; and
update the metadata for the first content item with a highest ranked received selection from the ranking of the plurality of received selections.

15. The system of claim 10, wherein the identifier tag comprises text, and wherein the control circuitry is further configured to cause to be presented the identifier tag during a presentation of the first content item.

16. The system of claim 10, wherein the control circuitry is configured to receive, at the user device, the selection of the identifier tag for the first content item by:
receiving an interaction, the interaction is one of a click, a tap, a double-tap, a press, or a swipe;
in response to receiving the interaction, generating one or more options for the user device to update the metadata of the first content item; and
receiving from the user device a selection of one or more options to update the metadata of the first content item.

17. The system of claim 10, wherein the control circuitry is further configured to:
search a plurality of videos for a video frame corresponding to a portion of the first content item;
generate the link to a video from the plurality of videos that comprises the video frame corresponding to the portion of the first content item, wherein the link comprises a timestamp of the video frame in the video; and
in response to receiving at the user device the second content item, cause to be presented the link to the video comprising the video frame.

18. The system of claim 10, wherein the identifier tag is a first identifier tag, and where the control circuitry is further configured to:
receive, at the user device, a second identifier tag with the second content item;
match the first identifier tag and the second identifier tag; and
wherein the control circuitry is configured to determine that the user device has previously received the second content item as the first content item based on matching the first identifier tag and the second identifier tag.

* * * * *